US009047533B2

(12) United States Patent
Bart

(10) Patent No.: US 9,047,533 B2
(45) Date of Patent: Jun. 2, 2015

(54) PARSING TABLES BY PROBABILISTIC MODELING OF PERCEPTUAL CUES

(75) Inventor: Evgeniy Bart, Sunnyvale, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 0 days.

(21) Appl. No.: 13/398,982

(22) Filed: Feb. 17, 2012

(65) Prior Publication Data

US 2013/0218913 A1    Aug. 22, 2013

(51) Int. Cl.
| | | |
|---|---|---|
| *G06F 7/00* | (2006.01) | |
| *G06K 9/34* | (2006.01) | |
| *G06F 17/30* | (2006.01) | |
| *G06K 9/00* | (2006.01) | |

(52) U.S. Cl.
CPC .......... *G06K 9/348* (2013.01); *G06F 17/30339* (2013.01); *G06K 9/00449* (2013.01)

(58) Field of Classification Search
CPC ............................................... G06F 17/30339
USPC ......................................................... 707/809
See application file for complete search history.

(56) References Cited

U.S. PATENT DOCUMENTS

| 5,485,566 | A * | 1/1996 | Rahgozar ..................... 715/200 |
| 2004/0006742 | A1 * | 1/2004 | Slocombe ..................... 715/513 |
| 2010/0275111 | A1 * | 10/2010 | Bastos Dos Santos et al. ............................. 715/227 |

OTHER PUBLICATIONS

D. P. Lopresti, et al., "A tabular survey of automated table processing," in *GREC '99*, 2000, pp. 93-120.

B. Klein, et al., "Results of a study on invoice-reading systems in Germany," in *DAS*, 2004.
R. Zanibbi, et al., "A survey of table recognition: Models, observations, transformations and inferences," *IJDAR*, vol. 7, No. 1, pp. 1-16, 2004.
D. W. Embley, et al., "Table-processing paradigms: a research survey," *IDJAR*, vol. 8, No. 2, pp. 66-86, 2006.
K. Zuyev, "Table image segmentation," in *ICDAR*, 1997.
B. Klein, et al, Three approaches to "industrial" table spotting,: in *ICDAR*, 2001.
F. Shafait, et al., "Table detection in heterogeneous documents," in *DAS*, 2010.
Y. Belaid, et al., "Morphological tagging approach in document analysis of invoices," in *ICPR*, 2004.
M. Hurst, "Layout and language: An efficient algorithm for detecting text blocks based on spatial and linguistic evidence," in *DRR VIII*, 2001.
M. Hurst, "A constraint-based approach to table structure derivation," in *ICDAR*, 2003.

(Continued)

*Primary Examiner* — Ajith Jacob
(74) *Attorney, Agent, or Firm* — Fay Sharpe LLP

(57) ABSTRACT

A method is provided for parsing a table. The method includes: receiving an input containing the table; finding candidate separators within the table; and determining which candidate separators are at least one of real and spurious by optimizing an objective function over the set of found candidate separators. Suitably, the function measures numerically whether a parse produced by the set of real separators is accurate. The function suitably includes one or more terms that account for multiple aspects of the table including at least two of: quality of candidate separators; coherence of cells within the parse; quality of cells within the parse; coherence of entire rows within the parse; quality of entire rows within the parse; coherence of entire columns within the parse; quality of entire columns within the parse; layout consistency along an axis of the table; and repeatability along the axis of the table.

19 Claims, 7 Drawing Sheets

(56) References Cited

OTHER PUBLICATIONS

I. A. Doush, et al., "Detecting and recognizing tables in spreadsheets," in *DAS*, 2010.

H. Hamza, et al., "Case-based reasoning for invoice analysis and recognition," in *Proc. 7th Intl. Conf. on Case-Based Reasoning*, 2007.

E. Bart, et al., "Information extraction by finding repeated structure," in *DAS*, 2010.

J. Hu, et al., "Evaluating the performance of table processing algorithms," *IJDAR*, vol. 4, No. 3, pp. 149-153, 2002.

J. Hu, et al., "Medium-independent table detection," *DRR VII*, 2000.

C. Peterman, et al., "A system for table understanding," in *SDIUT*, 1997.

* cited by examiner

10

| | | | |
|---|---|---|---|
| 330-1987 | DELL USB KEYBOARD,NO HOT KEYS ENGLISH,BLACK,OPTIPLEX | EA | 0.00 |
| 320-3704 | NO MONITOR SELECTED, OPTIPLEX | EA | 0.00 |
| 320-7363 | • 256MB ATI RADEON HD 3470 GRAPHICS s W/ DUAL DISPLAY PORT, FH,OPTIPLEX | EA | 0.00 |
| 341-8007 | 160GB SATA 3.0Gb/s AND 8MB DATA BURST CACHE,DELL OPTIPLEX | EA | 0.00 |
| 341-3909 | NO FLOPPY DRIVE WITH OPTICAL FILLER PANEL,DELL OPTIPLEX MINITOWER | EA | 0.00 |

| FRAME SIZE | PROCESSING SPEED - FPS |
|---|---|
| 128 X 128 | 1615 |
| 256 X 256 | 1076 |
| 512 X 512 | 323 |
| 1K X 1K | 89.9 |
| 2K X 2K | 23.8 |
| 4K X 4K | 6 |
| 8K X 8K | 1.5 |

FIG. 1B

| | | | | | | | | | | | |
|---|---|---|---|---|---|---|---|---|---|---|---|
| QUIET | 0.20 | 0.100 | 90.9 | 90.5 | 90.7 | 0.34 | 88.2 | 88.8 | 88.5 | 87.3 | 85.1 | 86.2 | 0.60 |
| VINSON QUIET | | 0.100 | 91.9 | 90.3 | 91.1 | 0.44 | 91.4 | 90.2 | 90.8 | 81.9 | 82.7 | 82.3 | 0.65 |
| OFFICE | 0.60 | 0.067 | 89.8 | 88.3 | 89.0 | 0.88 | 89.6 | 88.1 | 88.8 | 84.8 | 85.5 | 85.2 | 0.81 |
| AUTO | | 0.067 | 88.9 | 83.3 | 86.1 | 0.85 | 89.0 | 84.8 | 86.9 | 73.1 | 63.7 | 68.4 | 0.73 |
| HUMVEE | | 0.067 | 60.6 | 65.4 | 63.0 | 0.95 | 65.2 | 73.3 | 69.3 | 21.7 | 41.7 | 31.7 | 2.26 |
| M2 BRADLEY | | 0.067 | 60.7 | 66.9 | 63.8 | 1.14 | 74.3 | 78.4 | 76.4 | 34.2 | 42.5 | 38.4 | 1.27 |
| HELICOPTER | | 0.067 | 61.0 | 66.6 | 63.8 | 0.94 | 75.6 | 78.9 | 77.2 | 39.4 | 55.8 | 47.6 | 1.24 |
| F-15 | | 0.067 | 73.0 | 75.5 | 74.3 | 0.79 | 74.7 | 78.6 | 76.6 | 70.5 | 69.4 | 69.9 | 0.88 |
| E3A | | 0.067 | 84.6 | 85.6 | 85.0 | 0.62 | 88.2 | 89.9 | 89.0 | 66.7 | 65.3 | 66.0 | 1.09 |
| P3C | | 0.067 | 85.7 | 82.7 | 84.2 | 1.19 | 89.5 | 86.0 | 87.7 | 80.9 | 78.5 | 79.7 | 1.00 |
| MCE | | 0.067 | 90.5 | 87.8 | 89.1 | 0.96 | 90.8 | 90.0 | 90.4 | 77.5 | 78.7 | 78.1 | 1.10 |
| BER | 0.10 | 0.050 | 90.3 | 86.0 | 88.2 | 0.73 | 86.1 | 87.8 | 86.9 | 80.0 | 82.7 | 81.4 | 0.90 |
| BLER | | 0.050 | 87.1 | 89.3 | 88.2 | 0.96 | 86.8 | 85.6 | 86.2 | 85.2 | 82.9 | 84.0 | 0.72 |
| S_TANDEM | 0.10 | 0.050 | 84.8 | 83.7 | 84.3 | 0.61 | 89.0 | 87.3 | 88.2 | 75.8 | 75.5 | 75.6 | 1.10 |
| D_TANDEM | | 0.050 | 83.0 | 80.6 | 81.8 | 0.96 | 84.4 | 85.9 | 85.2 | 72.0 | 73.5 | 72.7 | 0.64 |
| INTELL. PERF | | | 81.860 | 81.867 | 81.859 | 0.260 | 84.402 | 85.097 | 84.742 | 0.297 | 69.157 | 71.250 | 70.202 | 0.332 |

FIG. 1C

| 12 | 12 | | 12 | 12 |
|---|---|---|---|---|
| 330-1987 | DELL USB KEYBOARD,NO HOT KEYS ENGLISH,BLACK,OPTIPLEX | | EA | 0.00 |
| 320-3704 | NO MONITOR SELECTED, OPTIPLEX | | EA | 0.00 |
| 320-7363 | • 256MB ATI RADEON HD 3470 GRAPHICS s W/ DUAL DISPLAY PORT, FH,OPTIPLEX | | EA | 0.00 |
| 341-8007 | 160GB SATA 3.0Gb/s AND 8MB DATA BURST CACHE,DELL OPTIPLEX | | EA | 0.00 |
| 341-3909 | NO FLOPPY DRIVE WITH OPTICAL FILLER PANEL,DELL OPTIPLEX MINITOWER | | EA | 0.00 |

FIG. 2A

| FRAME SIZE | PROCESSING SPEED - FPS |
|---|---|
| 128 X 128 | 1615 |
| 256 X 256 | 1076 |
| 512 X 512 | 323 |
| 1K X 1K | 89.9 |
| 2K X 2K | 23.8 |
| 4K X 4K | 6 |
| 8K X 8K | 1.5 |

FIG. 2B

| | 12 | 12 | | 12 | | 12 | | 12 | | 12 | | 12 |
|---|---|---|---|---|---|---|---|---|---|---|---|---|
| QUIET | 0.20 | 0.100 | 90.9 | 90.5 | 90.7 | 0.34 | 88.2 | 88.8 | 88.5 | 0.85 | 87.3 | 85.1 | 86.2 | 0.60 |
| VINSON QUIET | | 0.100 | 91.9 | 90.3 | 91.1 | 0.44 | 91.4 | 90.2 | 90.8 | 0.66 | 81.9 | 82.7 | 82.3 | 0.65 |
| OFFICE | 0.60 | 0.067 | 89.8 | 88.3 | 89.0 | 0.88 | 89.6 | 88.1 | 88.8 | 0.50 | 84.8 | 85.5 | 85.2 | 0.81 |
| AUTO | | 0.067 | 88.9 | 83.3 | 86.1 | 0.85 | 89.0 | 84.8 | 86.9 | 1.02 | 73.1 | 63.7 | 68.4 | 0.73 |
| HUMVEE | | 0.067 | 60.6 | 65.4 | 63.0 | 0.95 | 65.2 | 73.3 | 69.3 | 1.33 | 21.7 | 41.7 | 31.7 | 2.26 |
| M2 BRADLEY | | 0.067 | 60.7 | 66.9 | 63.8 | 1.14 | 74.3 | 78.4 | 76.4 | 0.94 | 34.2 | 42.5 | 38.4 | 1.27 |
| HELICOPTER | | 0.067 | 61.0 | 66.6 | 63.8 | 0.94 | 75.6 | 78.9 | 77.2 | 0.78 | 39.4 | 55.8 | 47.6 | 1.24 |
| F-15 | | 0.067 | 73.0 | 75.5 | 74.3 | 0.79 | 74.7 | 78.6 | 76.6 | 1.11 | 70.5 | 69.4 | 69.9 | 0.88 |
| E3A | | 0.067 | 84.6 | 85.6 | 85.0 | 0.62 | 88.2 | 89.9 | 89.0 | 0.94 | 66.7 | 65.3 | 66.0 | 1.09 |
| P3C | | 0.067 | 85.7 | 82.7 | 84.2 | 1.19 | 89.5 | 86.0 | 87.7 | 0.72 | 80.9 | 78.5 | 79.7 | 1.00 |
| MCE | | 0.067 | 90.5 | 87.8 | 89.1 | 0.96 | 90.8 | 90.0 | 90.4 | 0.75 | 77.5 | 78.7 | 78.1 | 1.10 |
| BER | 0.10 | 0.050 | 90.3 | 86.0 | 88.2 | 0.73 | 86.1 | 87.8 | 86.9 | 0.67 | 80.0 | 82.7 | 81.4 | 0.90 |
| BLER | | 0.050 | 87.1 | 89.3 | 88.2 | 0.96 | 86.8 | 85.6 | 86.2 | 0.78 | 85.2 | 82.9 | 84.0 | 0.72 |
| S_TANDEM | 0.10 | 0.050 | 84.8 | 83.7 | 84.3 | 0.61 | 89.0 | 87.3 | 88.2 | 1.03 | 75.8 | 75.5 | 75.6 | 1.10 |
| D_TANDEM | | 0.050 | 83.0 | 80.6 | 81.8 | 0.96 | 84.4 | 85.9 | 85.2 | 0.70 | 72.0 | 73.5 | 72.7 | 0.64 |
| INTELL. PERF | | | 81.860 | 81.867 | 81.859 | 0.260 | 84.402 | 85.097 | 84.742 | 0.297 | 69.157 | 71.250 | 70.202 | 0.332 |

FIG. 2C

| | | | |
|---|---|---|---|
| 330-1987 | DELL USB KEYBOARD, NO HOT KEYS ENGLISH, BLACK, OPTIPLEX | EA | 0.00 |
| 320-3704 | NO MONITOR SELECTED, OPTIPLEX | EA | 0.00 |
| 320-7363 | 256MB ATI RADEON HD 3470 GRAPHICS s W/ DUAL DISPLAY PORT, FH, OPTIPLEX | EA | 0.00 |
| 341-8007 | 160GB SATA 3.0Gb/s AND 8MB DATA BURST CACHE, DELL OPTIPLEX | EA | 0.00 |
| 341-3909 | NO FLOPPY DRIVE WITH OPTICAL FILLER PANEL, DELL OPTIPLEX MINITOWER | EA | 0.00 |

FIG. 5

PARSING TABLES BY PROBABILISTIC MODELING OF PERCEPTUAL CUES

BACKGROUND

The present inventive subject matter relates generally to the art of automated document processing. Particular but not exclusive relevance is found in connection with parsing images of tables and other unstructured representations of tables, e.g., such as may be found in a Portable Document Format (PDF) document, a Microsoft Word document, a HyperText Markup Language (HTML) document, etc. Where appropriate in the present specification, references to table images or images of tables or the like are intended to include such other unstructured representation. In any event, it is to be appreciated that aspects of the present inventive subject matter are also equally amenable to other like applications.

Tables commonly occur in many different varieties in many different types of documents, and they often contain important information. For example, business reports summarize vital information about balances, cash flow, and projections in tables. Invoices and receipts typically lay out the information about the purchases in a tabular form. Scientific papers often summarize key experimental results in tabular format. Healthcare documents and/or forms commonly contain tables as well.

Extracting information from such tables while preserving the table structure is useful for many applications. For example, the product names extracted from an invoice could be matched to a database to verify receipt before remitting payment. In the healthcare domain, claims processing could be assisted by extracting the information from tables on the claim forms. Such information extraction can also benefit other applications such as data mining and analytics. One difficulty in this data extraction task is that the tabular structure encodes important information which is not contained in the text of any individual cells. Therefore, simple Optical Character Recognition (OCR) of the table may recover the text, but not the structure of the table.

Currently, many businesses perform the aforementioned extraction task manually. This can lead to significant costs of document processing. For example, it has been estimated that the cost of processing a single invoice is not insignificant. In some cases, large businesses may process tens of thousands of invoices per day, which can result in disadvantageously high operating costs. Accordingly, some may find it desirable to reduce the manual effort involved in extracting information from tables in documents.

Accordingly, a new and/or improved method and/or system or apparatus for parsing images of tables is disclosed which addresses the above-referenced problem(s) and/or others.

SUMMARY

This summary is provided to introduce concepts related to the present inventive subject matter. The summary is not intended to identify essential features of the claimed subject matter nor is it intended for use in determining or limiting the scope of the claimed subject matter. The embodiments described below are not intended to be exhaustive or to limit the invention to the precise forms disclosed in the following detailed description. Rather, the embodiments are chosen and described so that others skilled in the art may appreciate and understand the principles and practices of the present inventive subject matter.

In accordance with one embodiment, a method is provided for parsing a table. The method includes: receiving an input containing the table; finding candidate separators within the table; and determining which candidate separators are at least one of real and spurious by optimizing an objective function over the set of found candidate separators. Suitably, the function measures numerically whether a parse produced by the set of real separators is accurate. The function suitably includes one or more terms that account for multiple aspects of the table including at least two of: quality of candidate separators; coherence of cells within the parse; quality of cells within the parse; coherence of entire rows within the parse; quality of entire rows within the parse; coherence of entire columns within the parse; quality of entire columns within the parse; layout consistency along an axis of the table; and repeatability along the axis of the table.

In accordance with another embodiment, a processor is provided for parsing a table. The processor is operative to: receive an input containing the table; find candidate separators within the table; and determine which candidate separators are at least one of real and spurious by optimizing an objective function over the set of found candidate separators. Suitably, the function measures numerically whether a parse produced by the set of real separators is accurate. The function suitably includes one or more terms that account for multiple aspects of the table including at least two of: quality of candidate separators; coherence of cells within the parse; quality of cells within the parse; coherence of entire rows within the parse; quality of entire rows within the parse; coherence of entire columns within the parse; quality of entire columns within the parse; layout consistency along an axis of the table; and repeatability along the axis of the table.

Numerous advantages and benefits of the inventive subject matter disclosed herein will become apparent to those of ordinary skill in the art upon reading and understanding the present specification. It is to be understood, however, that the detailed description of the various embodiments and specific examples, while indicating preferred and other embodiments, are given by way of illustration and not limitation. Many changes and modifications within the scope of the present invention may be made without departing from the spirit thereof, and the invention includes all such modifications.

BRIEF DESCRIPTION OF THE DRAWING(S)

The following detailed description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

FIGS. 1a, 1b and 1c are examples of images of simple tables suitable for input in accordance with aspects of the present inventive subject matter.

FIGS. 2a, 2b and 2c are examples of output parses of the tables from FIGS. 1a, 1b and 1c, respectively, obtained in accordance with aspects of the present inventive subject matter.

FIG. 5 illustrates the table of FIG. 1a including candidate separators found in accordance with aspects of the present inventive subject matter.

DETAILED DESCRIPTION OF THE EMBODIMENT(S)

Figure 3:
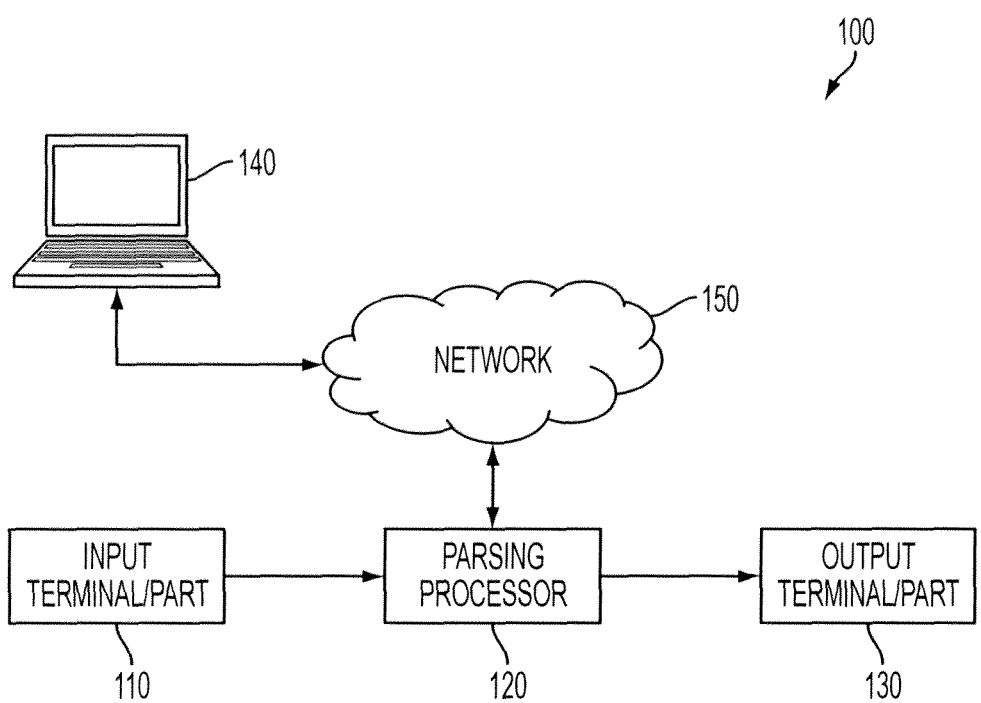
FIG. 3 is a diagrammatic illustration showing an exemplary apparatus and/or system suitable for practicing aspects of the present inventive subject matter.

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred embodiment(s) presented herein. Moreover, the apparatuses and methods disclosed in the present specification are described in detail by way of examples and with reference to the figures. Unless otherwise specified, like numbers in the figures indicate references to the same, similar or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific materials, techniques, arrangements, etc. are either related to a specific example presented or are merely a general description of such a material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the figures.

In general, the present inventive subject matter relates to a method and/or apparatus or device for automatically parsing and/or otherwise processing images of tables, e.g., such as may be found in various types of documents. In particular, the method and/or apparatus is useful for parsing and/or otherwise processing an input image of a table, which is a so-called simple table. A simple table, as referred to herein, is a matrix-like table where all the cells thereof are laid out in a regular two-dimensional grid, i.e., without any compound or merged cells. In other words, simple tables have cell separators (i.e., row or horizontal separators and column or vertical separators) that span, uninterrupted, the entire extend (i.e., width and height) of the table. In some cases, the separators may include visible lines or other like borders, and in other cases, the separators may be characterized by white space and/or non-visible lines or other like invisible borders. In yet other cases, any indications of the separators may be absent completely, and thus the separators would be conceptual only. For example, FIGS. 1a, 1b and 1c illustrate examples of simple tables 10, while FIGS. 2a, 2b and 2c depict output parses of the respective tables 10 as obtained by the method and/or apparatus described herein. More specifically, the heavy and/or darkened lines 12 in FIGS. 2a, 2b and 2c denote the parse structure and/or cell separators as determined by the automatic table parsing described herein. Note that this representation of the parse is used here for readability. In other cases, the representation used in practice in a specific embodiment may include, instead of or in addition to, one or more electronic data formats suitable for storing in a file or a database, exchanging over a network, and the like.

In practice, to parse the input image of a simple table, the method and/or apparatus described herein uses a variety of perceptually motivated cues (e.g., such as alignment and saliency) to characterize the table's separators, as well as the cells, rows and columns of the table. Candidate parses are evaluated by comparing the likelihoods of the aforementioned characteristics appearing in correct table parses to their likelihoods of appearing in incorrect table parses. The described approach deals successfully with a wide variety of tables.

With reference now to FIG. 3, there is shown a diagrammatic illustration of an exemplary apparatus and/or system 100 for parsing an input image of a simple table (e.g., such as one shown in FIGS. 1a, 1b and/or 1c). As shown, the system 100 includes an input terminal and/or part 110 which captures, reads, receives and/or otherwise obtains the input image. For example, the input terminal or part 110 may include a scanner or the like which receives, reads and/or otherwise obtains the input image of the simple table. Note that this input terminal may not be dedicated to the table parsing system; rather, it may be a part of a larger document processing system and may share data with the table parsing subsystem as well as with other systems. For example, the input image of the table may be contained on a document or the like which is fed into, scanned and/or otherwise read by the input terminal and/or part 110.

The input terminal and/or part 110 in turn provides the input image of the simple table to a table parsing part and/or processor 120 that parses the simple table in the input image. The resulting parse and/or other output from the parsing part and/or processor 120 is then provided, e.g., to an output terminal and/or part 130. Optionally, the output terminal and/or part 130 may include a display or monitor or printer or memory or data storage device or other like output device on which the resulting parse of the input table is selectively output and/or saved. Suitably, the resulting output and/or parse may simply be saved using a suitable format in a data file or the like on a volatile or non-volatile memory or in another suitable data storage device (e.g., which uses electronic, magnetic, optical or other like data storage media). Optionally, the output may also be shown in human-readable format, such as using the table image and heavy or darkened or otherwise distinguished lines 12 or the like to denote the cell separators and/or parsed structure (e.g., as shown in FIGS. 2a, 2b, and/or 2c).

In practice, the input image of the table may be received in the form of a data file or the like. Suitably, the received file may be received in and/or converted to one or more various formats, e.g., such as Tagged Image File Format (TIFF), Graphics Interchange Format (GIF) or other bitmap image format, Joint Photographic Experts Group (JPEG) format, Portable Document Format (PDF) or another suitable format for providing an input image of the table and/or other unstructured representation of the table. Optionally, the input file or data may be received by the parsing part and/or processor 120 from a computer, work station or other user terminal 140, e.g., over a suitable communications network 150. In turn, the parse and/or other output from the parsing part and/or processor 120 may be returned thereto, e.g., also via the network 150.

Figure 4:
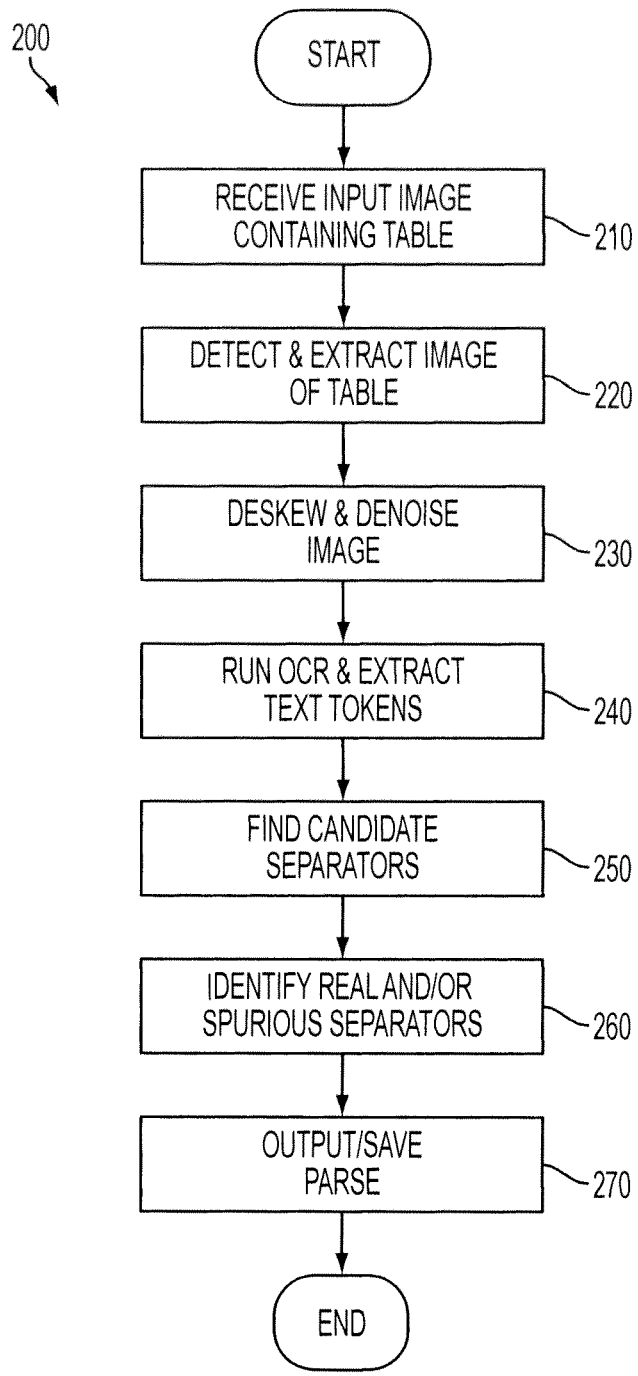
FIG. 4 is a flow chart showing an exemplary method and/or process for parsing an image of a simple table in accordance with aspects of the present inventive subject matter.

With reference now to FIG. 4, there is shown an exemplary method or process 200, e.g., carried out by the processor 120 of the system 100, by which an input image of a simple table is parsed.

As shown, at step 210 an input image containing a simple table is received, e.g., from the input terminal or part 110 or from the user terminal 140 via the network 150. Suitably, the input image may contain just the simple table, in which case a following step 220 may be skipped or omitted. However, alternately, the input image may contain other material in addition to the simple table. Accordingly, at step 220 a simple table is detected within the input image and the image of the table extracted therefrom. One example implementation of this step may include detecting regions of interest in the input image, and/or employing other techniques as are known in the art.

In one suitable embodiment, at step 230 the image of the table is deskewed and/or denoised. Where step 220 has been included, step 230 may optionally be performed before step 220 on the entire image.

At step 240, optical character recognition (OCR) is suitably run on the image of the table and text tokens are identified and/or extracted. For example, the text tokens usually correspond to individual words or characters. Optionally, in cases where the text tokens are already provided by the underlying data format (e.g., such as in some PDF documents), this step may be omitted.

In the illustrated embodiment, at step 250 candidate cell separators are found. Suitably, the candidate separators include both row or horizontal separators and column or vertical separators. FIG. 5 illustrates an example of candidate separators found for the table of FIG. 1*a*. In FIG. 5, the darkened or heavy lines 14 denote candidate separators. Note that some of these candidates (such as candidate 14*a* and candidate 14*b* in this example) are spurious and do not correspond to any real cell separator. Of course, in practice, spurious candidates may also be found in the vertical direction.

In one suitable embodiment, projection profiles of the input image of the table are calculated and thresholded to find the candidate separators. For example, the image may be projected in the horizontal direction to obtain a first profile which is thresholded to find horizontal candidate separators, and the image may similarly be projected in the vertical direction to obtain a second profile which is thresholded to find vertical candidate separators. Each projection profile may simply be an aggregate or summation or other like composite of pixel data or values (e.g., pixel intensity) or the like in the direction of the projection. Alternatively, it may be an aggregate of the token values computed in step 240 or values derived from those. Suitably, candidate separators are found and/or defined at each location along the profile where the projection satisfies the established threshold criteria or value(s). Suitably, the threshold criteria and/or value(s) are established and/or otherwise set so that all the real separators in the table are found, albeit potentially along with some spurious separators.

Having found the candidate separators in step 250, it is now determined, in step 260, which of the candidate separators are real (i.e., correspond to a real cell separator) and which ones are spurious (i.e., do not correspond to a real cell separator). Finally, at step 270 a resulting parse is output and/or saved (e.g., to the output terminal and/or part 130 and/or to the user terminal 140 via network 150). As can be appreciated, the resulting parse includes the real separators and omits or excludes the spurious separators, as identified in step 260. Optionally, the parsed table and/or data therein may be output to and/or stored in a spreadsheet or spreadsheet data file or a suitable database, e.g., in an appropriate format. Suitably in this case, the data in each of the cells as defined by the cell separators of the resulting parse are mapped to corresponding cells and/or fields in the spreadsheet and/or database.

Suitably, the task of determining which candidate separators are real and which are spurious is solved and/or completed by optimizing an objective function over the set of candidate separators. This objective function has one Boolean variable for every candidate separator; a true value indicates that the corresponding separator is real, and a false value indicates that the corresponding separator is spurious. The function measures the likelihood that the parse produced by the set of real separators is correct. A suitable objective function is described next, including a description of the function's multiple terms in part under the subheadings A-D; and, optimization of the objective function is described thereafter, in part under the subheading E.

In practice, the objective function includes several terms, each corresponding to a different aspect of a table. In one embodiment, the aspects that are considered are the row/column separators; the individual cells; entire rows and entire columns; and, repeatability of table structure. The terms for each aspect are detailed below under the respective subheadings A-D.

A. Separators

The purpose of this term is to evaluate and/or represent the quality of the proposed cell separators. In one embodiment, this is performed by extracting features (or perceptual cues) for each separator, and using a Naive Bayes classifier, for example, to compute the log-likelihoods of these features. Suitably, the following features are identified, detected and/or otherwise extracted for each separator:

dimensions of the separator (i.e., width and/or height);
width of rule lines (if any) within the current separator;
number of text or other token or the like aligned at endpoints of the separator; and
number of text or other tokens or the like that intersect the separator.

However, other features and/or additional features may be used in other embodiments, and other and/or additional classifiers may be used. In addition, not only the log-likelihoods, but any other type of score or confidence measures may be used.

In practice, a suitable probabilistic model, e.g., such as a Naive Bayes model, is trained to categorize separators as either real or spurious. A manually annotated set of tables may be used for this training. In accordance with the training, all candidate separators are extracted and/or considered; separators which correspond to a ground truth cell boundary (i.e., a known real separator) become positive examples, and the remaining (i.e., spurious) separators become negative examples. The log-likelihood ratio is then given by:

$$L(\{f_i\}_{i=1}^n) = \log \frac{p(\{\{f_i\}_{i=1}^n | \text{real})}{p(\{\{f_i\}_{i=1}^n | \text{spurious})} = \sum_{i=1}^n w_i[f_i];$$

where $f_i$ is the value of the i'th feature and $w_i$ is the weight assigned to that value. Suitably, these weights are learned by computing the probabilities $p(f_i = f_0 | \text{real})$ and $p(f_i = f_0 | \text{spurious})$ from the training data and setting the weight to $$w_i[f_0] = \log \frac{p(f_i = f_0 | \text{real})}{p(f_i = f_0 | \text{spurious})}.$$

Suitably, a separate set of weights is computed for the horizontal and vertical separators to capture any systematic differences in their properties. To compute the overall quality of all separators in a table, the log-likelihoods for each separator may be simply added or otherwise similarly aggregated or combined.

Note that by comparing the log-likelihoods of separators to a threshold, it is conceivable that one could obtain binary 'real/spurious' decisions. However, binary decisions at this early stage could lead to poor performance, especially in cases where the separators are ambiguous and cannot be determined by their visual appearance alone. Therefore, as proposed herein, the log-likelihood is used as a component in a global optimization criterion instead of making binary decisions.

B. Cells

The purpose of this term is to evaluate and/or represent the coherence of the table cells. Overall, this term is handled similarly to the term above.

First, the cell locations are determined from the boundaries with the corresponding variables set to true (these are the hypothesized real separators). For each cell, features (or perceptual cues) that measure the cell's perceptual coherence are identified, detected and/or otherwise extracted. For example, these features may include but are not limited to:

- the sizes of the largest horizontal and vertical whitespaces within the cell (the idea is that a coherent block of text or the like is usually typeset without large gaps; the presence of significantly large gaps therefore indicates that the candidate may in fact be an aggregation of multiple cells);
- whether the cell is "properly terminated" (e.g., the value of this feature may be 0, if the cell text is terminated improperly, defined, for example, as ending with a dash or a comma or another character not typically found at the end of a cell entry; otherwise, the cell is considered to be terminated properly, and the value of this feature may be 1; note that ways to measure proper continuation may also be applied);
- the number of text lines in the cell that only include numeric characters (e.g., digits, periods, commas, and dashes); and
- the size of the largest unfilled space within a cell (e.g., a space at the end of a text line is considered "unfilled" if the first token on the subsequent text line could have fit within it).

As before, a Naive Bayes model is trained and used to compute the log-likelihood for each cell, and these individual log-likelihoods are aggregated over all cells.

C. Rows and Columns

The purpose of these terms is to evaluate and/or represent the coherence of entire rows and/or columns of the table. Recall that the cells were determined in the step above. In this case, an entire row and/or column is considered at a time, and feature measurements are used to learn the log-likelihood. For example, identified, detected and/or otherwise extracted features (or perceptual cues) may measure the numbers of empty and/or non-empty cells and the degree of alignment of cells within the row or column.

D. Axial Layout Consistency

In one embodiment, the method and/or apparatus disclosed herein may mostly deal with tables found in invoices and similar documents. In those tables, each row may correspond to a particular product, and each column may correspond to an attribute of that product (e.g., such as quantity or price). The row layout as in this case therefore may be fixed and repeated for every row. Accordingly, the purpose of the axial layout consistency term is to evaluate and/or represent this consistency. A suitable probabilistic model may be used for this evaluation, such as those known in the art. One such suitable model is disclosed in a paper by E. Bart and P. Sarkar, entitled "Information Extraction by Finding Repeated Structure," published in DAS '10 Proceedings of the 9th IAPR International Workshop on Document Analysis Systems (2010), which is incorporated by reference herein in its entirety. Note that in general tables contain repeated layout across either rows or columns. In another embodiment, a more general approach would therefore involve first detecting the axis (either rows or columns) along which the layout is repeated, and then evaluating layout consistency along that axis.

E. Optimization

Together and/or collectively, the terms described above are used to specify an objective function that provides a numerical or other like score for a proposed set of cell separators. In one embodiment, this objective function may be just the sum of all terms. In other embodiments, the terms might be summed with suitable weights, or combined in some other manner. Suitably then, the parsing is performed by selecting a subset of the candidate separators which maximizes this objective function. A suitable selection process in this regard is detailed below.

In one exemplary embodiment, the column separators are considered in the order of decreasing separator score (see, e.g., subheading A herein), and for each subset of column separators, the best subset of row separators is selected as described below. The best table (in terms of the overall score) is selected from this set as the optimal parse.

In one embodiment, the selection of the optimal subset of row separators for the given set of column separators may be performed essentially by a brute force search, e.g., in which each different possible combination and/or subset of separators is evaluated to determine which one maximizes the objective function. Optionally, the search is done progressively from the top of the table to the bottom of the table, insomuch as the bottommost rows may only weakly affect the decisions of the topmost rows.

Accordingly, the table parsing method and/or system described herein uses a wide variety of perceptual cues to characterize different aspects of the table, e.g., including the separators, cells, rows, columns and axial layout consistency. A probabilistic model is trained to evaluate these characteristics and select the optimal parse.

The above methods and/or apparatus have been described with respect to particular embodiments. It is to be appreciated, however, that certain modifications and/or alteration are also contemplated.

For example, the factorizations used in the models can be changed, or additional terms incorporated. In one suitable embodiment, terms that involve three candidate blocks or cells may be useful to incorporate relations such as 'in between'. Optionally, the Naive Bayes assumption used to model each term may be replaced by other known modeling methods from machine learning. Some of the features that are used and/or described above or that can be used may not be independent, and taking the dependencies into account might be advantageous. Methods closest to Naive Bayes that can incorporate such dependencies are known. In yet other embodiments, additional features may be used beyond those described above with respect to the various terms of the objective function. In particular, incorporating more perceptual cues can be useful. Optionally, a wide array of features that characterize the appearance of text or data in each cell and/or field may be used or feature that characterize the format or appearance of the cell or field itself or the appearance of the cell or field background, e.g., these can include font characteristics (face, size, weight, slant, etc.), color, texture measures, and others.

Additionally, other optimization methods may optionally be used, e.g., such as A*, Gibbs sampling or dynamic programming-based methods. As still another alternative, somewhat local optimization methods (i.e., those which optimize a subpart of the table rather than the whole table at once) can be used with varying results. Optionally, other known training methods may be used for training the Naive Bayes models, and/or other additional models used beyond the Naive Bayes model.

Notably, in various embodiments, the methods and/or system or apparatus disclosed herein has the ability to solve a wider range of problems than previously possible. Suitably, a single system can appropriately parse a broad range of tables from several different categories (such as invoices, receipts, and healthcare forms). Previously, e.g., separate systems were typically used and/or specifically tuned for each different task or category.

In particular, the approach described herein suitably uses a fully probabilistic formulation (as opposed to a set of ad hoc rules). This tends to provide greater flexibility and allows the method/system to cope with more variability in table structure as compared to previous methods/systems. The present approach also tends to use a broader range of cues compared to previously described models. Specifically, the use of cell-based, row-based, and column-based cues in addition to the boundary-based cues, in the same system, was heretofore unknown. For example, perceptual cues used in previous systems were largely limited to alignment and proximity. As disclosed herein, the method/system incorporates additional useful cues, e.g., such as the presence of gaps, amount of whitespace, etc. These are especially helpful when the method/system needs to adapt to structures that occupy varying numbers of lines.

In any event, it is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, methods, functions, elements and/or components described herein may suitably be implemented via hardware, software, firmware or a combination thereof. In particular, the parsing processor 120 may be embodied by a computer or other electronic data processing device that is configured and/or otherwise provisioned to perform one or more of the tasks, steps, processes, methods and/or functions described herein. For example, a computer or other electronic data processing device embodying the parsing processor 120 may be provided, supplied and/or programmed with a suitable listing of code (e.g., such as source code, interpretive code, object code, directly executable code, and so forth) or other like instructions or software or firmware, such that when run and/or executed by the computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method for parsing a table, said method comprising:
receiving an input containing the table;
finding a set of candidate separators within the table, said set of candidate separators including at least one real separator which is indeed a true separator for the table when properly parsed and at least one spurious separator which is not a true separator for the table when properly parsed; and
determining which candidate separators in the set thereof are real separators and which are spurious separators by optimizing an objective function over the set of found candidate separators, wherein said function measures numerically whether a parse produced by the set of real separators is accurate, said function including one or more terms that account for multiple aspects of the table including at least two of: quality of candidate separators; coherence of cells within the parse; quality of cells within the parse; coherence of entire rows within the parse; quality of entire rows within the parse; coherence of entire columns within the parse; quality of entire columns within the parse; layout consistency along an axis of the table; and repeatability along the axis of the table.

2. The method of claim 1, said method further comprising:
at least one of deskewing and denoising the input image prior to the step of finding.

3. The method of claim 1, said method further comprising:
running optical character recognition on the table, prior to the step of finding, in order to extract text tokens from the table.

4. The method of claim 1, wherein when said input includes other content in addition to the table, said method further comprises:
detecting said table within said input; and,
extracting the table from the input.

5. The method of claim 1, further comprising:
outputting a parse of said table, said output parse including the set of real separators which optimizes the objective function.

6. The method of claim 1, wherein the object function includes one or more terms that account for all the identified aspects.

7. The method of claim 1, wherein a machine learning method is used to at least one of evaluate or determine parameters of at least one of the terms of the objective function.

8. The method of claim 1, wherein a probabilistic model is used to at least one of evaluate or determine parameters of at least one of the terms of the objective function.

9. The method of claim 8, wherein one or more features characterize aspects of the table, said features including all of:
sizes of the largest horizontal and vertical whitespaces within a cell;
how a cell is terminated;
number of text lines in a cell that only include numeric characters; and
a size of a largest unfilled space within a cell.

10. The method of claim 1, wherein the table is a simple table.

11. A processor for parsing a table, said processor being operative for:
receiving an input containing the table;
finding a set of candidate separators within the table, said set of candidate separators including at least one real separator which is indeed a true separator for the table when properly parsed and at least one spurious separator which is not a true separator for the table when properly parsed; and
determining which candidate separators in the set thereof are real separators and which are spurious separators by optimizing an objective function over the set of found candidate separators, wherein said function measures numerically whether a parse produced by the set of real separators is accurate, said function including one or more terms that account for multiple aspects of the table including at least two of: quality of candidate separators; coherence of cells within the parse; quality of cells within the parse; coherence of entire rows within the parse; quality of entire rows within the parse; coherence of entire columns within the parse; quality of entire columns within the parse; layout consistency along an axis of the table; and repeatability along the axis of the table.

12. The processor of claim 11, said processor being further operative for:
at least one of deskewing and denoising the input prior to the step of finding.

13. The processor of claim 11, said processor being further operative for:
running optical character recognition on the input, prior to the step of finding, in order to extract text tokens from the table.

14. The processor of claim 11, wherein when said input includes other content in addition to the table, said processor being further operative for:
detecting said table within said input; and,
extracting the table from the input.

15. The processor of claim 11, said processor being further operative for:
outputting a parse of said table, said output parse including the set of real separators which optimizes the objective function.

16. The processor of claim 11, wherein the object function includes one or more terms that account for all the identified aspects.

17. The processor of claim 11, wherein a machine learning method is used to at least one of evaluate or determine parameters of at least one of the terms of the objective function.

18. The processor of claim 11, wherein a probabilistic model is used to at least one of evaluate or determine parameters of at least one of the terms of the objective function.

19. The processor of claim 18, wherein one or more features characterize aspects of the table, said features including all of:
sizes of the largest horizontal and vertical whitespaces within a cell;
how a cell is terminated;
number of text lines in a cell that only include numeric characters; and
a size of a largest unfilled space within a cell.

* * * * *